US006413024B1

(12) United States Patent
Chen

(10) Patent No.: US 6,413,024 B1
(45) Date of Patent: Jul. 2, 2002

(54) KEY CODE CUTTING DEVICE

(75) Inventor: Waterson Chen, Taichung (TW)

(73) Assignee: Saint Island International Patent & Law offices, Taipei (TW)

( * ) Notice: Subject to any disclaimer, the term of this patent is extended or adjusted under 35 U.S.C. 154(b) by 0 days.

(21) Appl. No.: 09/730,094

(22) Filed: Dec. 5, 2000

(51) Int. Cl.[7] ............................................. B23C 1/16
(52) U.S. Cl. ............................ 409/83; 76/110; 409/82
(58) Field of Search ........................... 409/81, 82, 83; 76/110; 83/917

(56) References Cited

U.S. PATENT DOCUMENTS

| | | | | |
|---|---|---|---|---|
| 4,140,043 A | * | 2/1979 | Huckinghaus et al. | 409/81 |
| 4,373,414 A | * | 2/1983 | Agius | 83/917 X |
| 4,411,567 A | * | 10/1983 | Agius | 409/82 |
| 4,526,498 A | * | 7/1985 | Fieldhouse | 409/83 X |
| 4,544,310 A | * | 10/1985 | Tynela et al. | 409/82 |
| 4,657,448 A | * | 4/1987 | Alexander | 409/81 |
| 4,671,711 A | * | 6/1987 | Steinbach | 76/110 X |

FOREIGN PATENT DOCUMENTS

| | | | | |
|---|---|---|---|---|
| DE | 3346689 | * | 7/1985 | 409/83 |
| JP | 4-19007 | * | 1/1992 | 409/83 |

* cited by examiner

*Primary Examiner*—William Briggs
(74) *Attorney, Agent, or Firm*—Wildman, Harrold, Allen & Dixon

(57) ABSTRACT

A key code cutting device includes a base, a milling tool, a carriage mounted on the base and movable along a first transverse direction, a work table mounted on the carriage and movable along a second transverse direction, a key holding member mounted on the work table and having a clamp member that is adapted to hold a key blank and that is rotatable about an axis, an urging member for urging the carriage to move along the first transverse direction, a key coding member for adjusting cutting positions of the key blank along the first transverse direction, and a locking member for locking the clamp member against angular movement about the axis.

8 Claims, 13 Drawing Sheets

KEY CODE CUTTING DEVICE

BACKGROUND OF THE INVENTION

1. Field of the Invention

This invention relates to a key code cutting device, more particularly to a key code cutting device that includes a key coding member for adjusting positions of a key blank in which the key blank is to be cut according to a code which defines a plurality of spacing each representing a distance between two adjacent cuts on the key blank.

2. Description of the Related Art

FIG. 1 illustrates one type of key blank 1 that has a blade portion 102 of a sector-shaped cross-section. The blade portion 102 of the key blank 1 has a key groove defined by first and second grooved faces 104, 105. A plurality of indentations (not shown) are to be formed in the second grooved face 105 to make a key. Conventionally, a key code cutting device can only cut the blade portion 102 in two dimensions (indicated as X and Z directions in FIG. 1) to form the indentations. In order to make a more complex key, there is a need to provide a key code cutting device that is capable of cutting the blade portion 102 in more than two dimensions.

SUMMARY OF THE INVENTION

Therefore, it is an object of the present invention to provide a key code cutting device that is capable of cutting the blade portion of the aforementioned key blank in more than two dimensions.

Accordingly, a key code cutting device of this invention comprises: a base; a milling tool mounted on the base and adapted to mill a key blank; a carriage mounted on the base and movable along a first transverse direction relative to the milling tool; a work table mounted on the carriage and movable toward and away from the milling tool along a second transverse direction relative to the milling tool, the first and second transverse directions being transverse to one another; a key holding member mounted on the work table and having opposite coaxial first and second clamp members which are aligned along the first transverse direction and which are adapted to hold opposite ends of the key blank, the first clamp member being turnable about an axis that extends through centers of the first and second clamp members; an urging member for urging the carriage to move in a direction from the second clamp member to the first clamp member along the first transverse direction; a key coding member mounted on the base and abutting adjustably against the carriage for adjusting positions of the carriage along the first transverse direction and thus cutting positions of the key blank where the key blank is to be cut by the milling tool; and a locking member mounted on the work table for locking the first clamp member against angular movement about the axis.

BRIEF DESCRIPTION OF THE DRAWINGS

In drawings which illustrate an embodiment of the invention.

DETAILED DESCRIPTION

Figure 1:
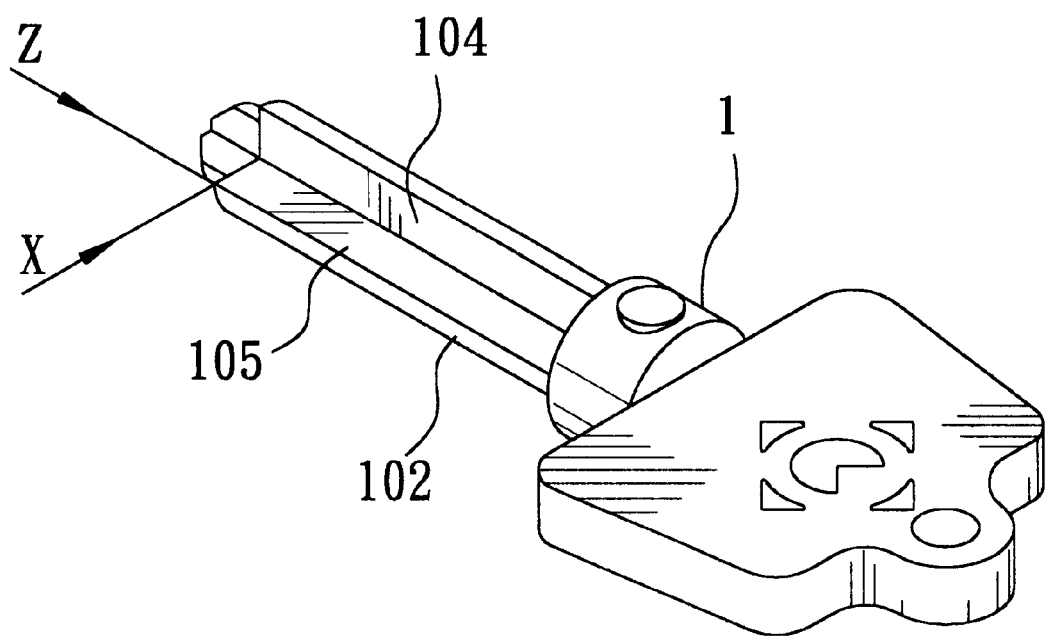
FIG. 1 is a perspective view to illustrate one type of a key blank.
Figure 2:
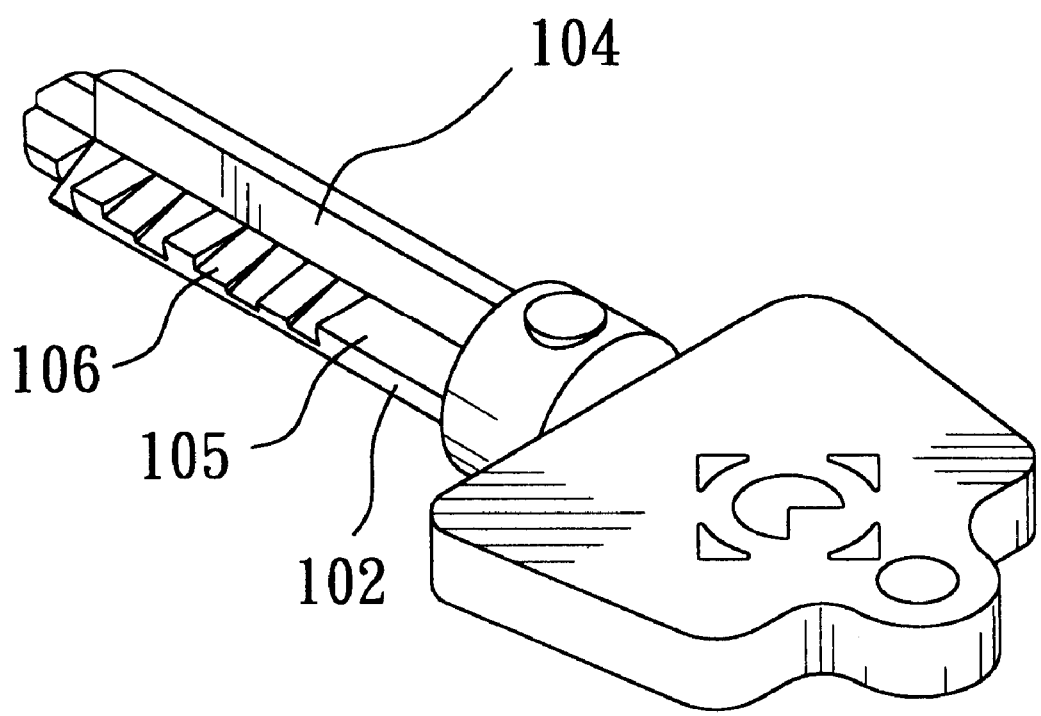
FIG. 2 is a perspective view of a key made from the key blank of FIG. 1.

FIG. 2 illustrates a key that is made from the aforementioned key blank 1. A plurality of indentations 106 are formed in the second grooved face 105, and are cut according to a code which defines a plurality of spacing, each representing a distance between two adjacent cuts on the key.

FIGS. 3 to 7 illustrate a key code cutting device embodying this invention and adapted to cut the aforesaid key blank 1 for forming the indentations 106 shown in FIG. 2. The key code cutting device includes a base 10, a stand 14 upright from the base 10, a driving unit (not shown), a rotatable shaft 15 mounted on the stand 14 and connected to the driving unit, a milling tool 16 projecting downwardly from the shaft 15, a carriage 20 mounted on the base 10 and movable along a first-transverse direction (indicated as "Z" in FIG. 3) relative to the milling tool 16, a work table 22 mounted on the carriage 20 below the milling tool 16 and movable toward and away from the milling tool 16 along a second transverse direction (indicated as "X" in FIG. 4) relative to the milling too 16, a key holding member mounted on the work table 22 and having opposite coaxial first and second clamp members 30, 40 which are aligned along the first transverse direction (Z) and which are adapted to hold opposite ends of the key blank 1 (see FIG. 8), an advancing member for moving the work table 22 toward and away from the milling tool 16 along the second transverse direction (X), a limiting member 60 mounted adjustably on the carriage 20 for controlling displacement of the work table 22 along the second transverse direction (X) when the work table 22 moves toward the milling tool 16, an urging member 13 mounted on the base 10 for urging the carriage 20 to move in a direction from the second clamp member 40 to the first clamp member 30 along the first transverse direction (Z), a key coding member 50 for adjusting positions of the key blank 1 along the first transverse direction (Z), a locking member mounted on the work table 22, a supporting member 25 mounted on the work table 22 between the first and second clamp members 30, 40 for supporting the key blank 1, and a brushing member 17 mounted on the stand 14. The first and second transverse directions (Z), (X) are transverse to one another.

Figure 3:
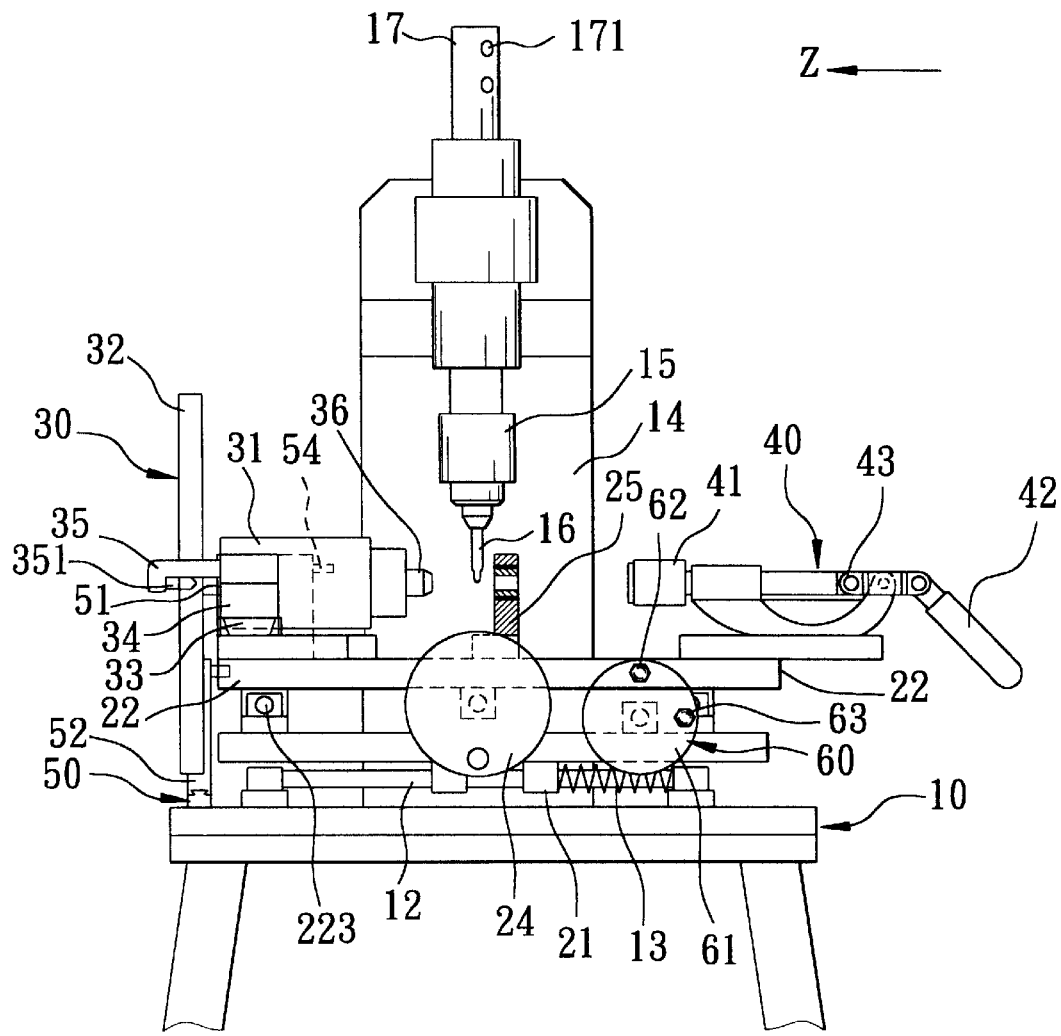
FIG. 3 is a front view of a key code cutting device embodying this invention.
Figure 4:
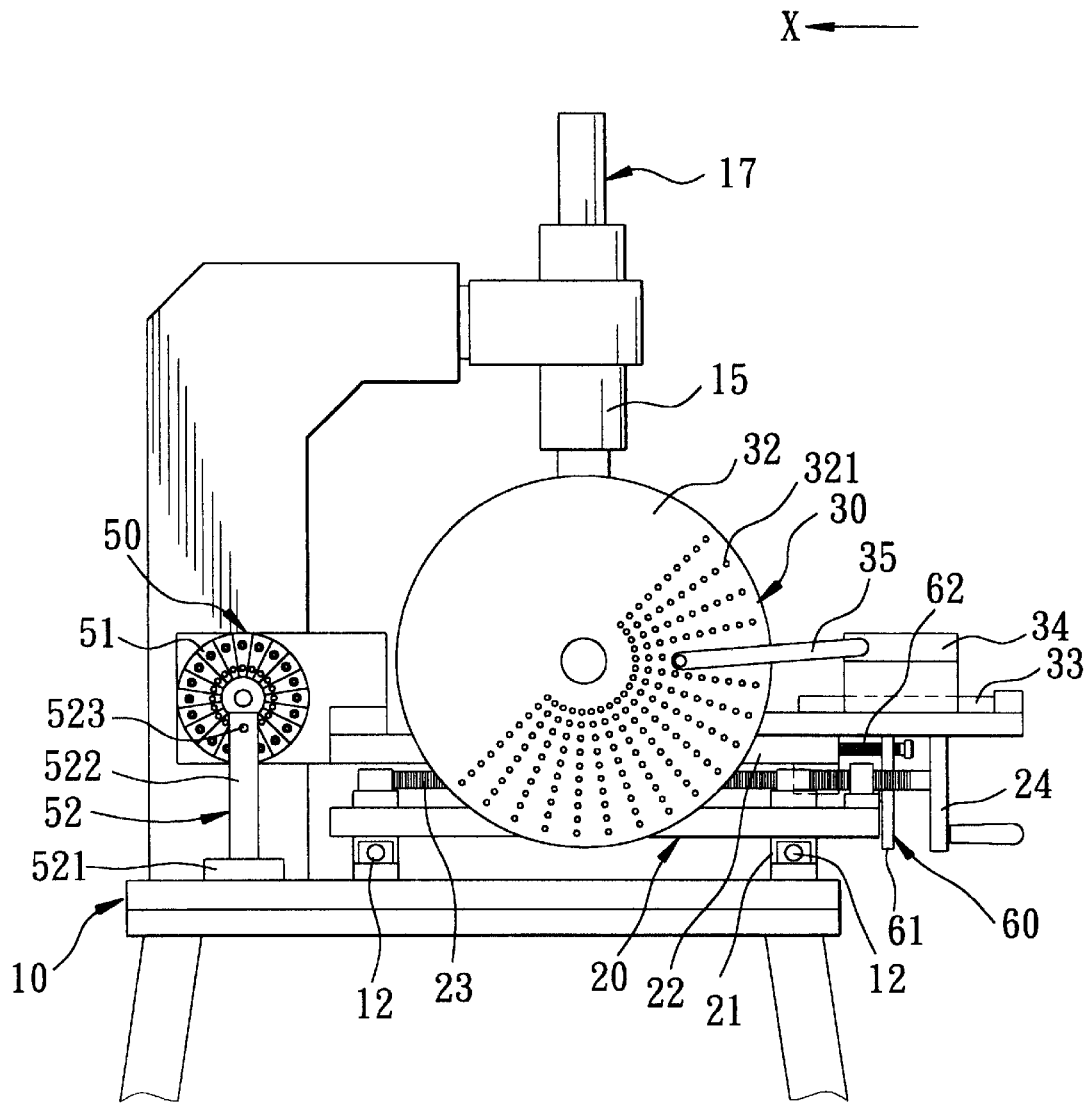
FIG. 4 is a side view of the key code cutting device of FIG. 3.

Referring to FIGS. 3 and 4, the base 10 includes a pair of parallel guide rods 12 extending in the first transverse direction (z). The carriage 20 includes a plurality of sleeves 21 sleeved around the guide rods 12 so as to be slidable along the guide rods 12. The urging member 13 includes a pair of coil springs sleeved respectively around the guide rods 12 and having ends abutting respectively against the sleeves 21 and ends of the guide rods 12 so as to urge the carriage 20 to move toward the first clamp member 30. The carriage 20 includes a pair of parallel guide rails 223 extending in the second transverse direction (X). The work table 22 is mounted slidably on the guide rails 223 so as to be slidable therealong. The advancing member includes a screw rod 23 that extends in the second transverse direction (X) and that threadedly engages the work table 22, and a handle-wheel 24 connected to the screw rod 23 for driving the latter to move the work table 22 along the guide rails 223.

Figure 5:
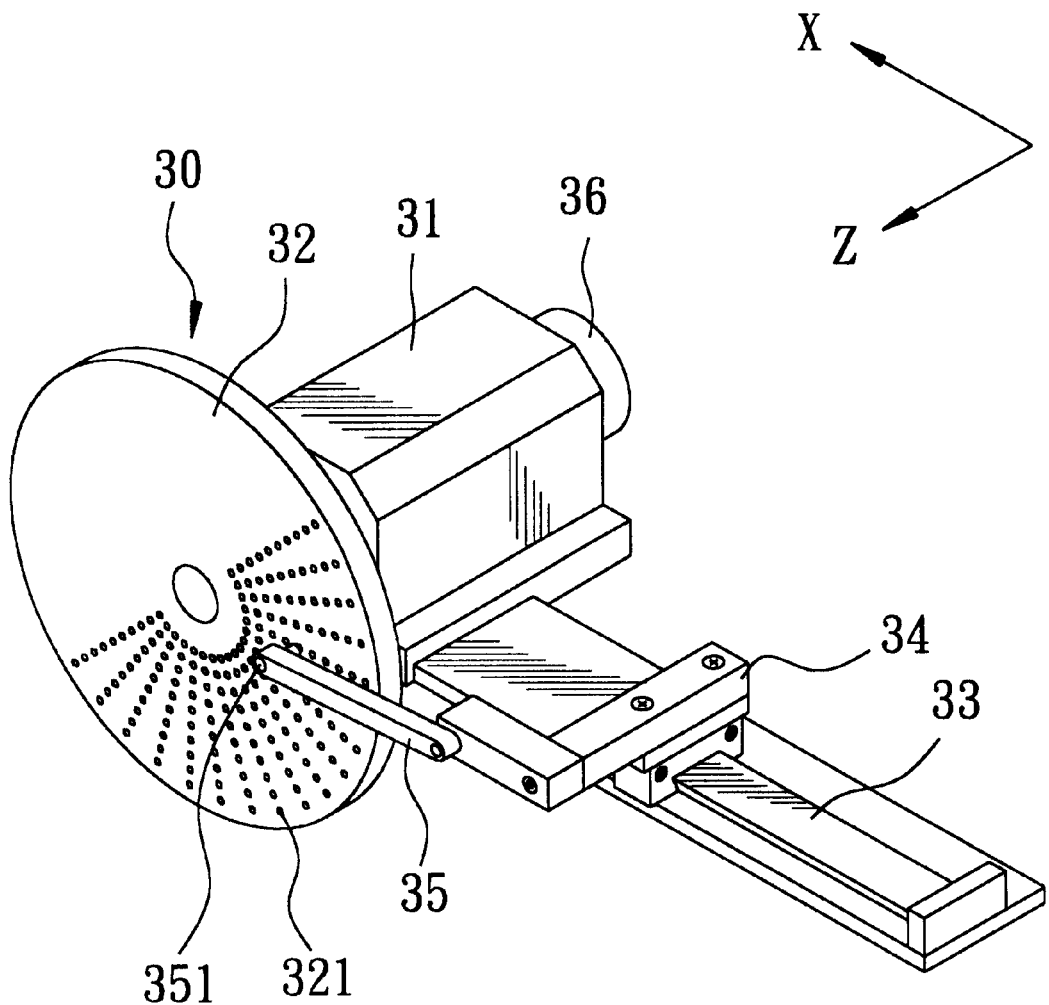
FIG. 5 is a perspective view of an indexing disc and a locking member of the key code cutting device of FIG. 3.
Figure 6:
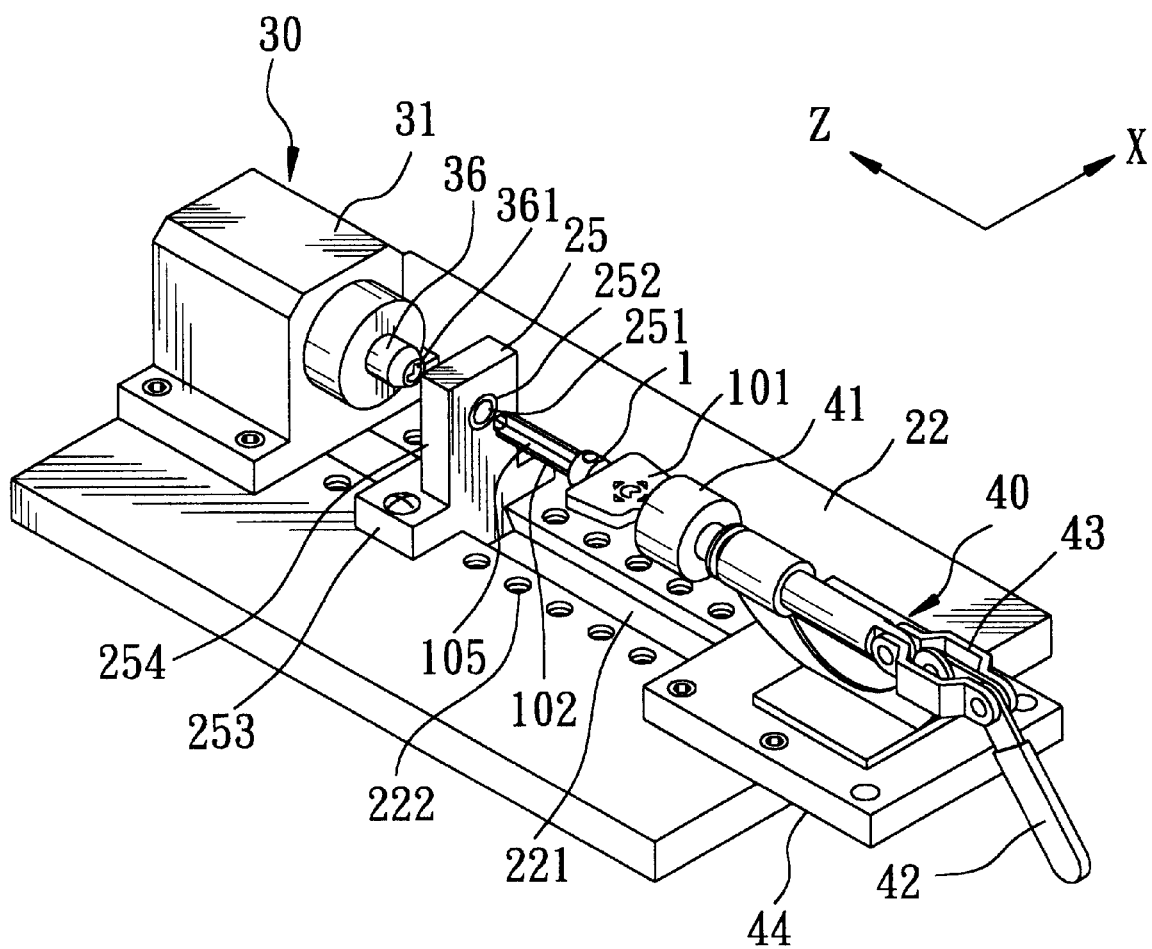
FIG. 6 is a perspective view of a key holding member and a supporting plate mounted on a work table of the key code cutting device of FIG. 3.

Referring to FIGS. 5 and 6, in combination with FIGS. 3 and 4, the first clamp member 30 includes a housing 31 mounted on the work table 22, a rotatable indexing disc 32 mounted on one end of the housing 31, and a turnable first clamp head 36 mounted on the other end of the housing 31 for clamping one end of the key blank 1, and connected to the indexing disc 32. The second clamp member 40 includes a seat 44 mounted on the work table 22 opposite to the housing 31, a linkage member 43 mounted movably on the seat 44, a handle 42 connected to one end of the linkage member 43, and a rotatable second clamp head 41 connected to the other end of the linkage member 43 for clamping the other end of the key blank 1. The first and second clamp heads 36, 41 and the indexing disc 32 are coaxially turnable about a first axis, which extends through centers of the first and second clamp heads 36, 41 in the first transverse direction (Z), so as to turn the key blank 1 to a desired cutting angle relative to the second grooved face 105 ( see the angle represented by a double-arrow line in FIGS. 9 and 10). The handle 42 is turnable upwardly and downwardly to move the second clamp head 41 toward and away from the first clamp head 36 in the first transverse direction (Z) so as to clamp the key blank 1 (see FIG. 8). The indexing disc 32 is formed with a plurality of successive holes 321, each of which represents a cutting angle to which the key blank 1 can be turned so that different depths of the indentations 106 from the second grooved face 105 in an angular direction can be formed in the blade portion 102 of the key blank 1. These successive holes 321 represent cutting angles ranging from 0 to 180°. The locking member includes a slide 34 mounted slidably on a guide rail 33 of the work table 22, a linkage plate 35 pivoted on the slide 34 and extending to the indexing disc 32, and a locking pin 351 projecting from the linkage plate 35 into a desired one of the holes 321 for locking the first clamp head 36 against angular movement about the first axis. The work table 22 is formed with a slot 221 and two rows of screw holes 222 at two opposite sides of the slot 221. The supporting member 25 includes a foot plate 253 that has two opposite ends secured to the work table 22 via screw means selectively extending through two adjacent screw holes 222 and the ends of the foot plate 253, an arm plate 254 upright from the foot plate 253 and formed with a through-hole 251 for receiving the key blank 1, and a bearing 252 inserted into the through-hole 251 for supporting the key blank 1.

Figure 7:
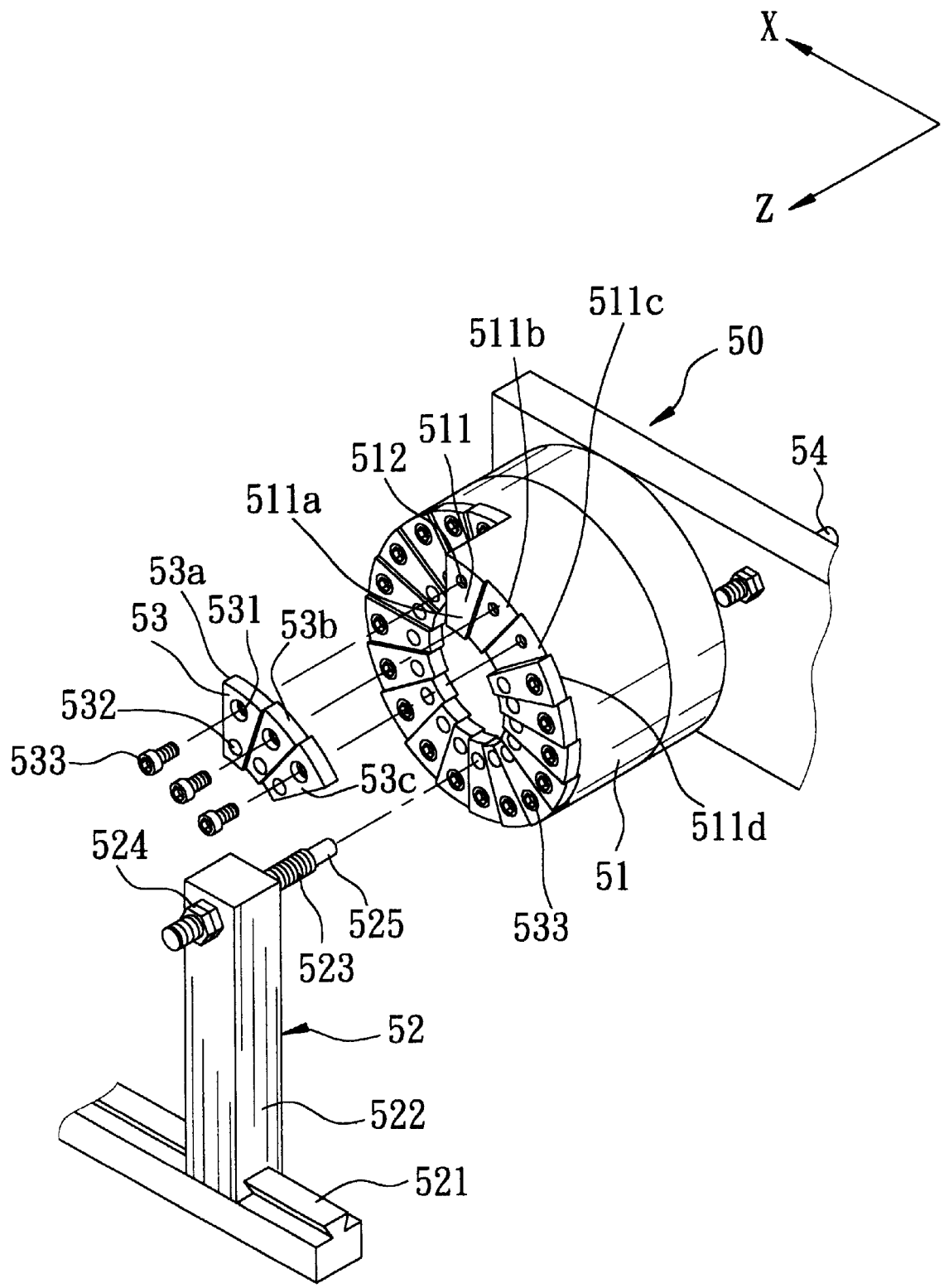
FIG. 7 is a perspective view of a key coding member of the key code cutting device of FIG. 3.
Figure 8:
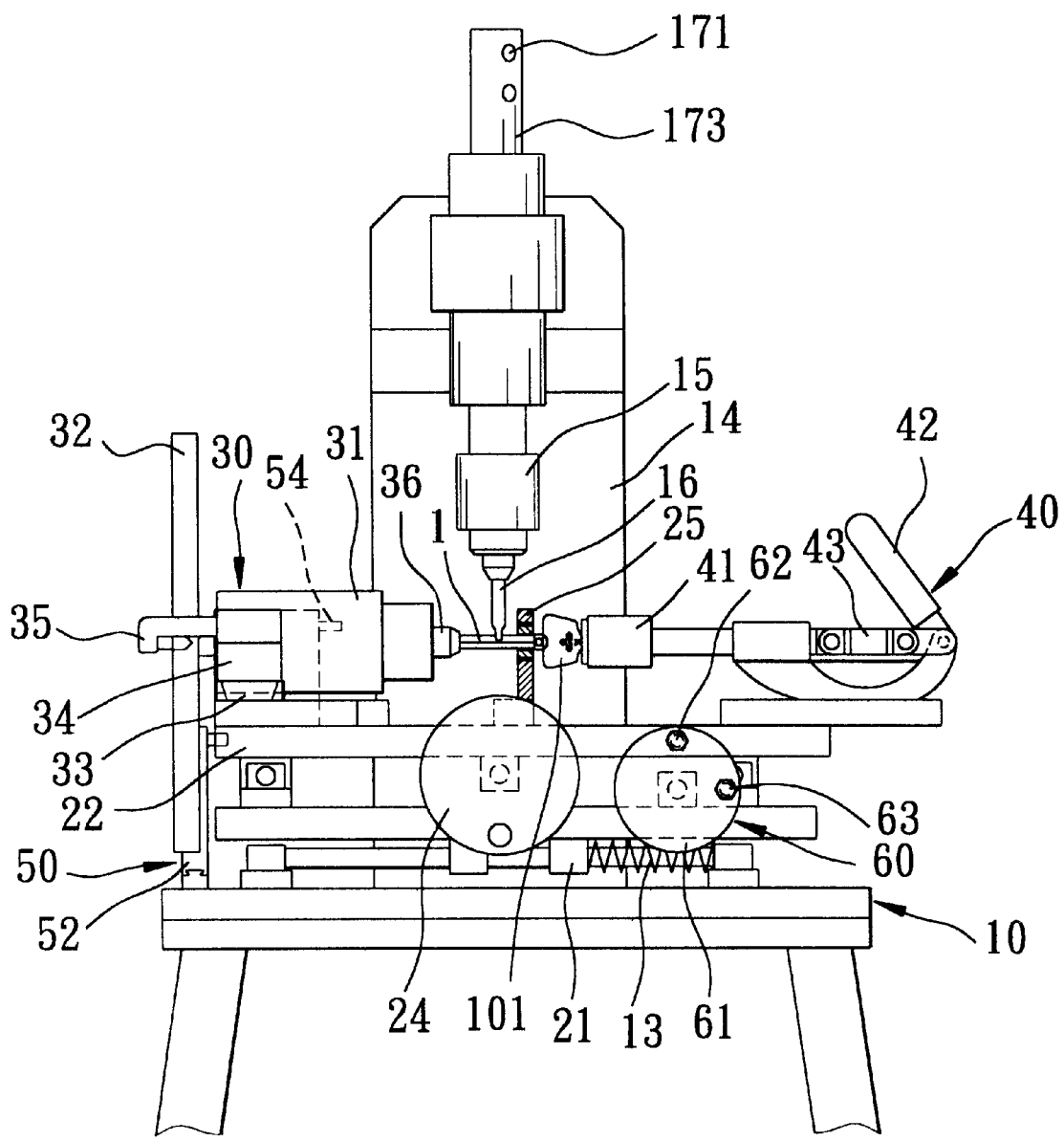
FIG. 8 is a front view of the key code cutting device of FIG. 3 with a key blank held by the key holding member.

Referring to FIGS. 7 and 8, in combination with FIG. 4, the key coding member 50 includes a cylindrical terrace wheel 51 mounted rotatably on the work table 22, extending along the first transverse direction, and having a stepped end face that is provided with a plurality of successive steps 511 which are respectively formed with screw holes 512. The key coding member further includes a plurality of sector-shape block gauges 53 having various thicknesses, and a carriage holding member 52 that includes a post 522 mounted slidably on a guide rail 521 of the base 10, and a threaded holding rod projecting from a top end of the post 522 toward the terrace wheel 51. At least one of the block gauges 53 is selected to be detachably mounted on a selected one of the steps 511 (according to the code for cutting the key blank 1) via screw means 533 extending through the screw hole 512 in the selected step 511 and the screw hole 531 in the selected block gauge 53. The holding rod includes a threaded portion 523 adjustably mounted on the post 522 via screw means 524, and a holding pin 525 extending from the threaded portion 523 into a retaining hole 532 in the selected block gauge 53. Combinations of the block gauges and the steps 511 represent numerous cutting positions where the key blank 1 is to be cut. The terrace wheel 51 is turnable about a second axis that is parallel to the first axis to permit engagement of the threaded portion 523 and a selected one of the block gauges 53 so as to position the key blank 1 at a desired one of the cutting positions. The carriage holding member 52 is slidable along the guide rail 521 so as to be moved along with the terrace wheel 51 in the second transverse direction (X) when the carriage 20 moves along the same direction (X). A carriage stopper 54 is connected to the terrace wheel 51, and projects toward a side wall of the stand 14 so as to prevent further advancement of the carriage 20 when the carriage stopper 54 is moved along with the carriage 20 to contact the stand 14.

Figure 9:
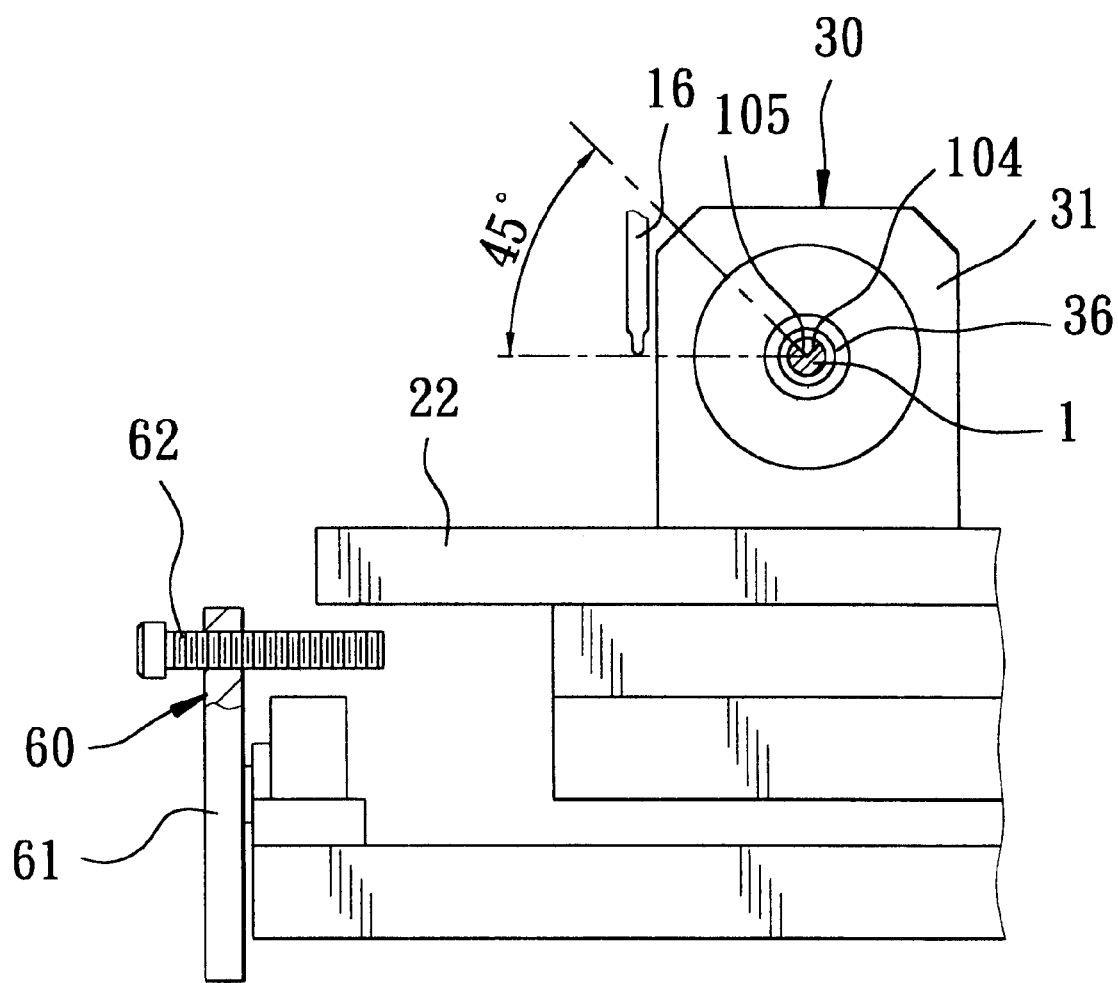
FIG. 9 is a fragmentary side view to illustrate a cutting angle that is to be cut on the key blank by a milling tool of the key code cutting device of FIG. 3.
Figure 10:
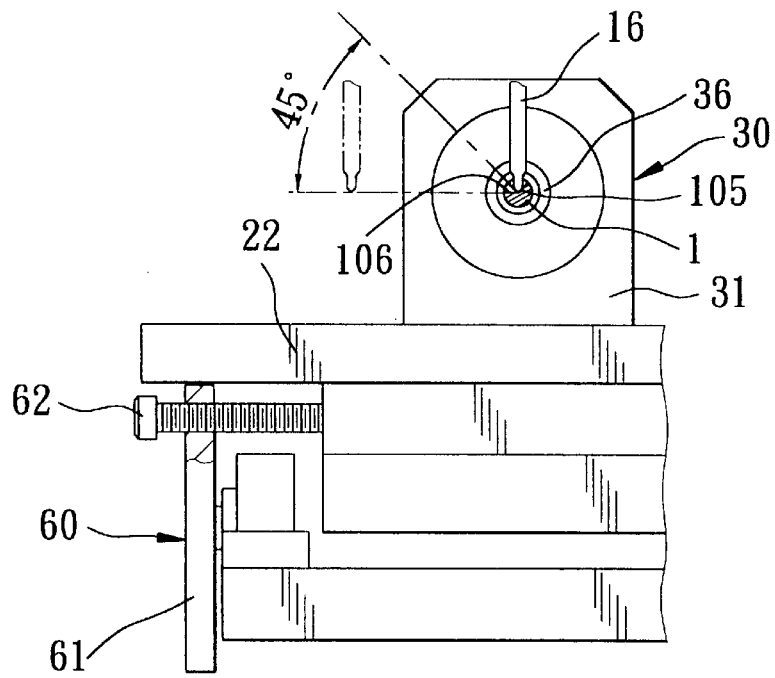
FIG. 10 is a fragmentary side view to illustrate position of the work table which is limited by a long stopper after the key blank is cut at the cutting angle shown in FIG. 9.
Figure 11:
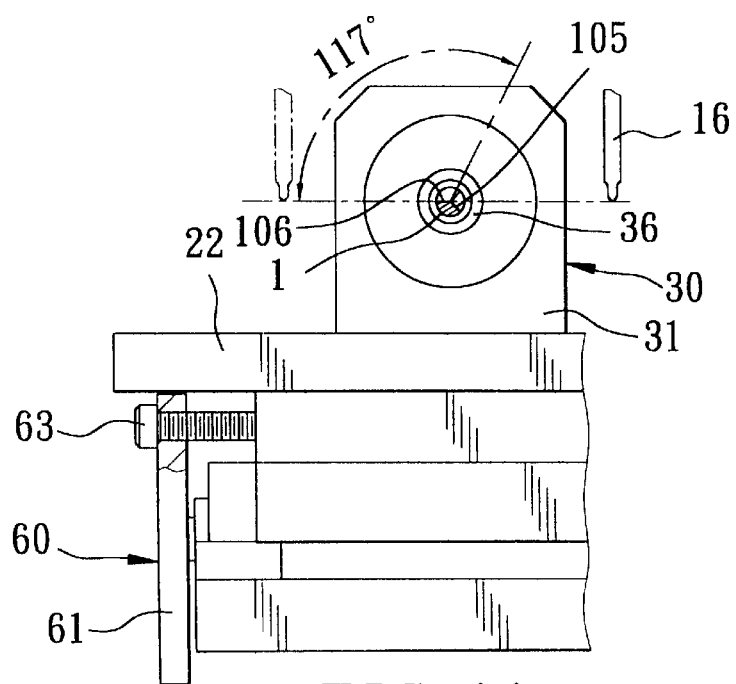
FIG. 11 is a fragmentary side view to illustrate another cutting angle that is to be cut on the key blank by the milling tool of the key code cutting device of FIG. 3 and position of the work table which is limited by a short stopper after the key blank is cut.

Referring to FIGS. 9 to 11, in combination with FIGS. 3 and 4, the limiting member 60 includes a roatable circular plate 61 mounted on the carriage 20 and spaced apart long and short stoppers 62, 63 mounted adjustably on and projecting from the circular plate 61 toward a side wall of the work table 22 so as to prevent further advancement of the work table 22 when the side wall of the work table 22 is moved in the second transverse direction (X) to selectively abut against one of the long and short stoppers 62, 63. When the cutting angle is less than 90° relative to the second grooved face 105 (see FIGS. 9 and 10), the long stopper 62 is turned to a position to be aligned with the side wall of the work table 22 via rotation of the circular plate 61, thereby preventing further advancement of the work table 22 when a center line of the key blank 1 reaches the milling tool 16. When the cutting angle is greater than 90° relative to the second grooved face 105 (see FIG. 11) the short stopper 63 is turned to a position to be aligned with the side wall of the work table 22 via rotation of the circular plate 61 so as to prevent further advancement of the work table 22 after the entire cross-section of the key blank 1 passes through the milling tool 16.

An example of formation of three successive first, second and third indentations 106*a,* 106*b,* 106*c* in the second grooved faced 105 of the key blank 1 according to a code, i.e. using different combinations of the block gauges 53 and the steps 511 in the key coding member 50 for cutting the key blank 1, is illustrated in FIGS. 7 and 12 to 15.

Figure 12:
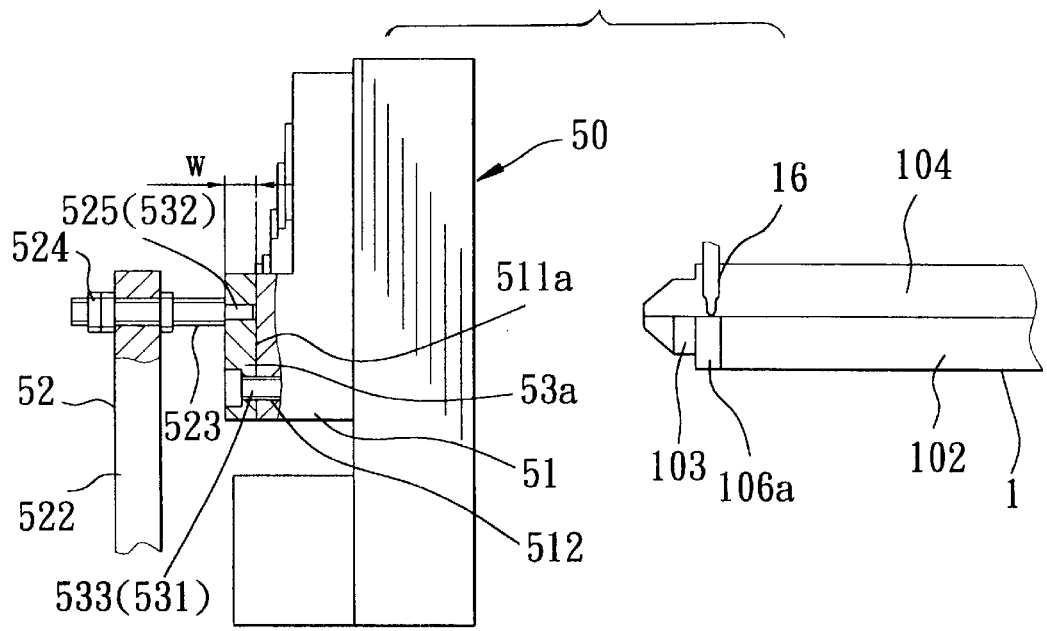
FIG. 12 is a fragmentary side view of the key coding member to illustrate formation of an indentation in the key blank which is cut at a position according to a code provided by the key coding member.

In FIG. 12, a first block gauge 53a is mounted on a first step 511a of the stepped end face of the terrace wheel 51, and engages the threaded portion 523 of the holding rod to position the key blank 1 at a first position relative to the milling tool 16 where the first indentation 106a is to be formed.

Figure 13:
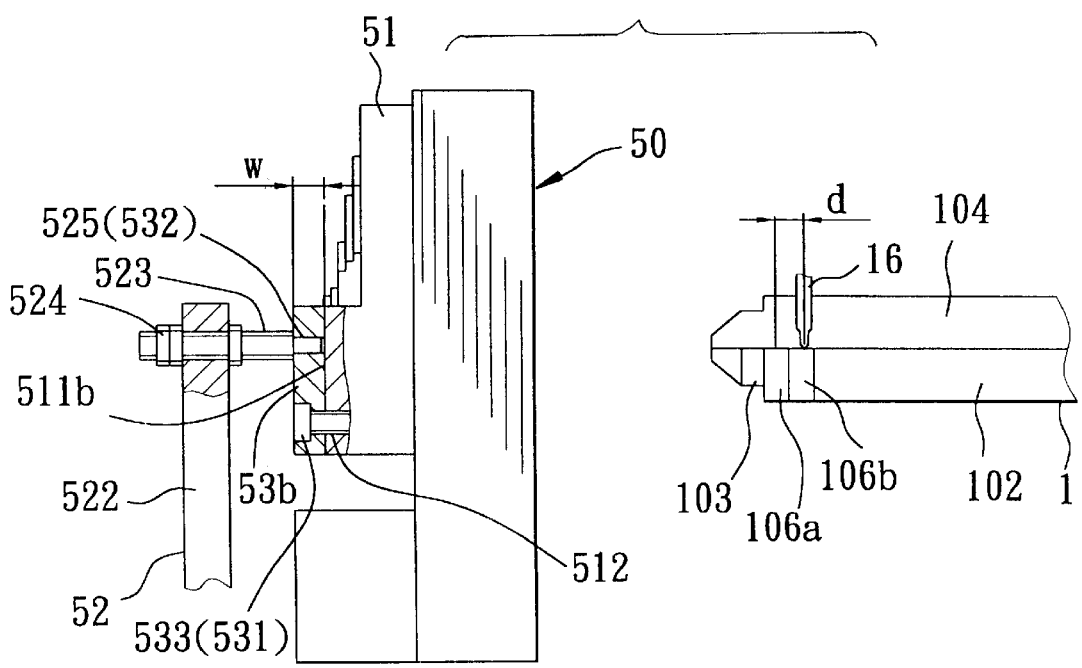
FIGS. 13 and 14 are fragmentary side views of the key coding member to illustrate steps of formation of another indentation adjacent to the previous indentation shown in FIG. 12.

In FIG. 13, a second block gauge 53b is mounted on a second step 511b of the stepped end face of the terrace wheel 51 which is adjacent to the first step 511a, and engages the threaded portion 523 of the holding rod to position the key blank 1 at a second position relative to the milling tool 16 where a portion of the second indentation 106b is to be formed. The aforesaid first and second block gauges 53a, 53b have the same thickness (indicated as "W" in FIGS. 12 and 13), and thus, the spacing (indicated as "d" in FIG. 13) between the first indentation 106a and the portion of the second indentation 106b is equal to the distance from the first step 511a to the second step 511b.

Figure 14:
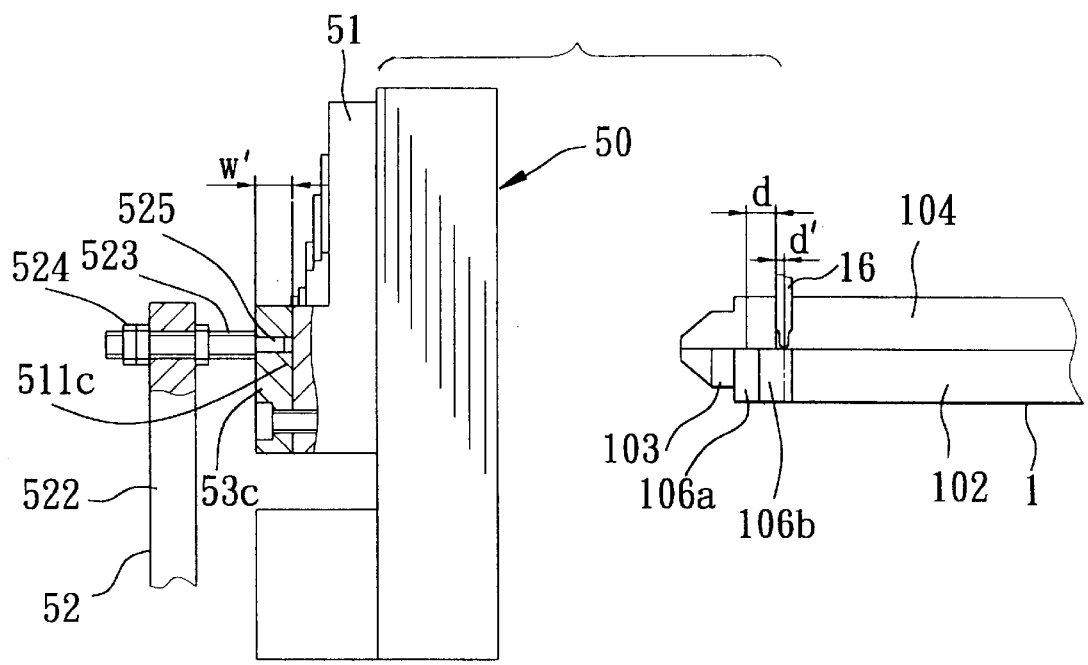

In FIG. 14, a third block gauge 53c is mounted on a third step 511c of the stepped end face of the terrace wheel 51 which is adjacent to the second step 511b, and engages the threaded portion 523 of the holding rod to position the key blank 1 at a third position relative to the milling tool 16 where the remaining portion of the second indentation 106b is to be formed. It is noted that the cutting angle for the formation of the remaining portion of the second indentation 106b remains the same as that for the formation of the portion of the second indentation 106b in FIG. 13, and that the distance between each two adjacent steps 51 is equal to the value "d". The third block gauge 53c has a thickness (indicated as "W'" in FIG. 14) greater than that of the second block gauge 53b. The spacing (indicated as "d'" in FIG. 14) 10 between the aforesaid portion and the remaining portion of the indentation 106b is equal to a value represented by the following formula:

$$d' = (W+d) - W'$$

Figure 15:
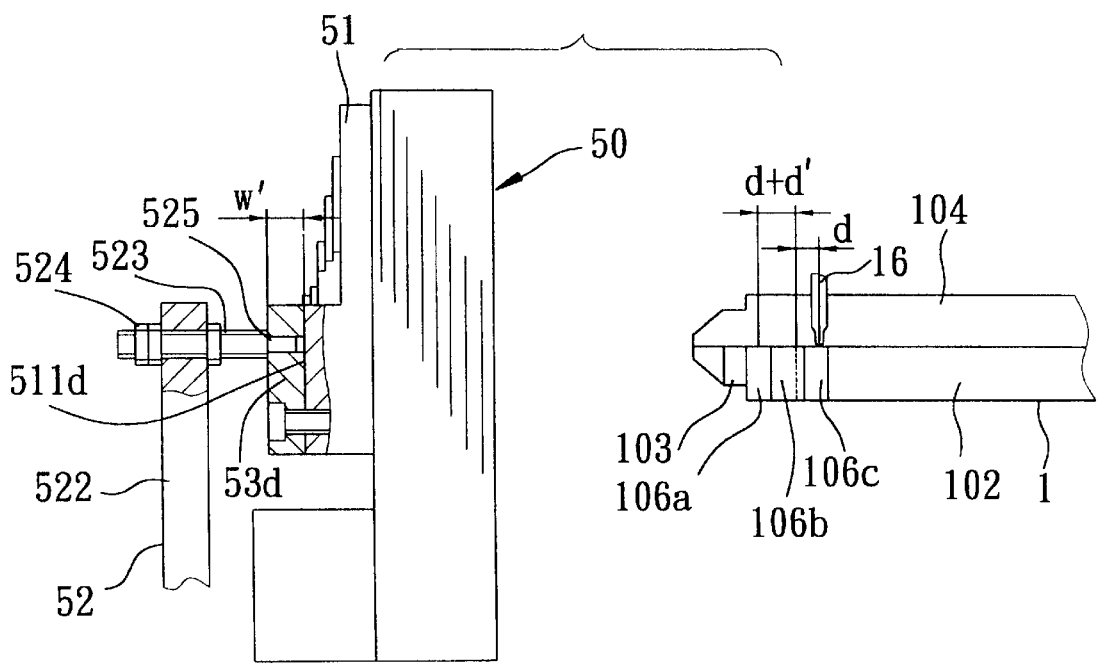
FIG. 15 is a fragmentary side view of the key coding member to illustrate formation of yet another indentation adjacent to the second indentation shown in FIG. 14.

In FIG. 15, a fourth block gauge 53d is mounted on a fourth step 5lid of the stepped end face of the terrace wheel 51 which is adjacent to the third step 511c, and engages the threaded portion 523 of the holding rod to position the key blank 1 at a fourth position relative to the milling tool 16 where the third indentation 106c is to be formed. The aforesaid third and fourth block gauges 53c, 53d have the same thickness, thus, the spacing between the remaining portion of the second indentation 106b and the third indentation 106c is equal to the distance from the third step 511c to the fourth step 511d, i.e. equal to the value "d".

Figure 16:
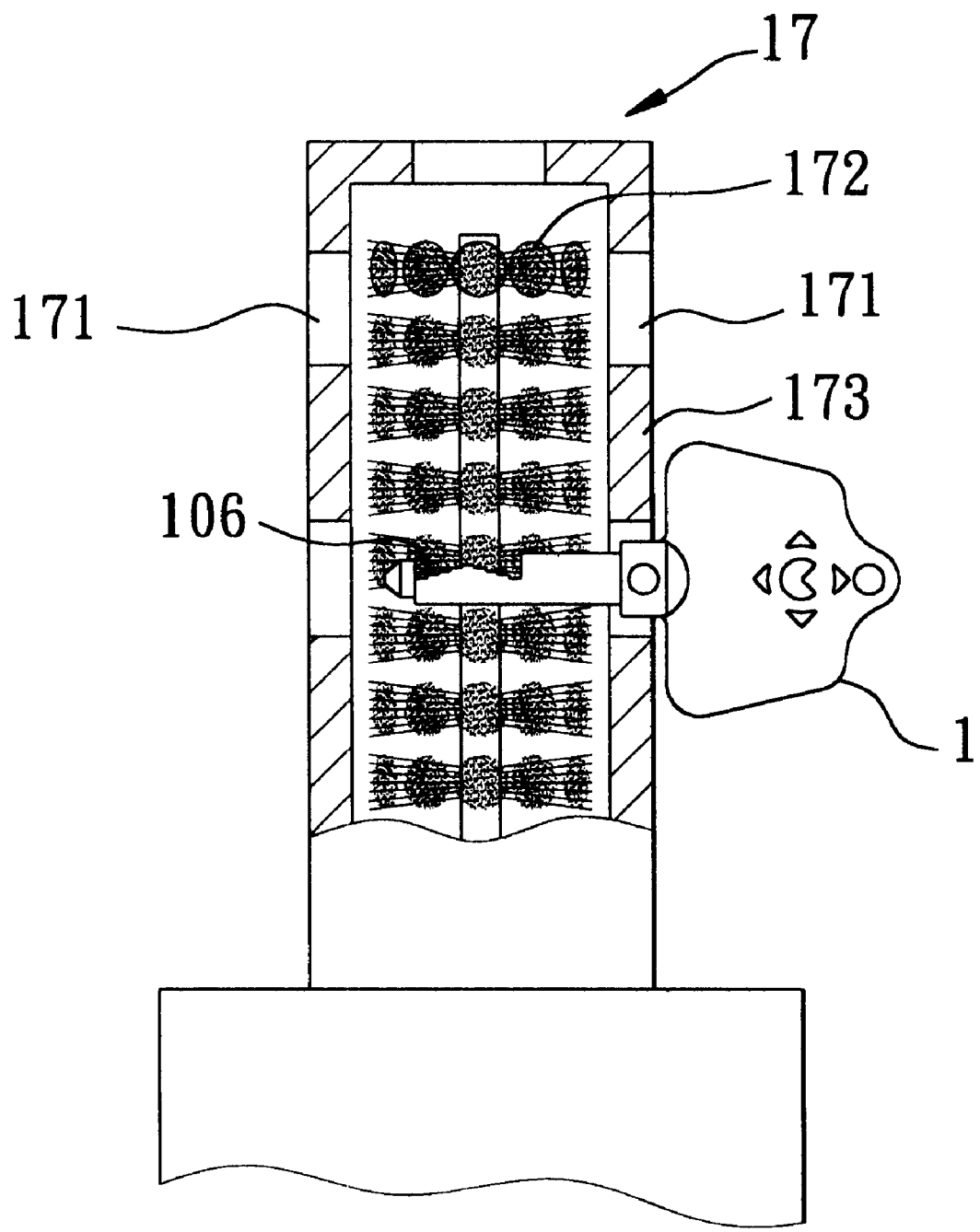
FIG. 16 is a cross-sectional side view of a brushing member of the key code cutting device of FIG. 3.

Referring now to FIG. 16, in combination with FIG. 3, the brushing member 17 includes a housing 173 formed with a plurality of key holes 171, and a brush 172 mounted movably in the housing 173 for cleaning the thus formed indentations 106 in the key blank 1.

With the invention thus explained, it is apparent that various modifications and variations can be made without departing from the spirit of the present invention. It is therefore intended that the invention be limited only as recited in the appended claims.

I claim:

1. A key code cutting device, comprising:
   a base;
   a milling tool mounted on said base and adapted to mill a key blank;
   a carriage mounted on said base and movable along a first transverse direction relative to said milling tool;
   a work table mounted on said carriage and movable toward and away from said milling tool along a second transverse direction relative to said milling tool, said first and second transverse directions being transverse to one another;
   a key holding member mounted on said work table and having opposite coaxial first and second clamp members which are aligned along said first transverse direction and which are adapted to hold opposite ends of the key blank, said first clamp member being turnable about a first axis that extends through centers of said first and second clamp members;
   an urging member for urging said carriage to move in a direction from said second clamp member to said first clamp member along said first transverse direction;
   a key coding member mounted on said base and abutting adjustably against said carriage for adjusting positions of said carriage along said first transverse direction and thus cutting positions of the key blank where the key blank is to be cut by said milling tool; and
   a locking member mounted on said work table for locking said first clamp member against angular movement about said first axis.

2. The key code cutting device of claim 1, further comprising an advancing member mounted on said carriage for moving said work table toward and away from said milling tool.

3. The key code cutting device of claim 2, further comprising a limiting member mounted adjustably on said carriage for controlling displacement of said work table along said second transverse direction when said work table moves toward said milling tool.

4. The key code cutting device of claim 2, wherein said carriage includes a pair of parallel guide rails extending in said second transverse direction, said work table being mounted slidably on said guide rails, said advancing member including a screw rod extending in said second transverse direction and threadedly engaging said work table, and a handle-wheel connected to said screw rod for driving said screw rod to move said work table along said guide rails.

5. The key code cutting device of claim 1, wherein said base includes a pair of parallel guide rods extending in said first transverse direction, said carriage having a plurality of sleeves sleeved around said guide rods so as to be slidable along said guide rods, said urging member including a pair of coil springs sleeved respectively around said guide rods and having ends abutting respectively against said sleeves and ends of said guide rods so as to urge said carriage to move toward said first clamp member.

6. The key code cutting device of claim 1, wherein said first clamp member includes a turnable clamp head adapted to clamp the key blank and turnable about said first axis, and an indexing disc coaxially connected to said clamp head and formed with a plurality of holes, each of which represents a cutting angle to which the key blank can be turned, said locking member including a slide mounted slidably on said work table, a linkage plate pivoted on said slide and extending to said indexing disc, and a locking pin projecting from said linkage plate into a desired one of said holes for locking said clamp head against angular movement about said first axis.

7. The key code cutting device of claim 1, wherein said key coding member includes a cylindrical terrace wheel mounted rotatably on said work table, extending along said first transverse direction, and having a stepped end face that is provided with a plurality of successive steps, said key coding member further including a plurality of sector-shape block gauges having various thicknesses, and a carriage holding member that includes a post upright from said base, and a holding rod projecting from a top end of said post toward said terrace wheel, at least one of said block gauges being selected to be detachably mounted on a selected one of said steps to be adapted to position the key blank at one of said cutting positions, said terrace wheel being turnable about a second axis that is parallel to said first axis to permit engagement of said holding rod with said selected one of said block gauges, said carriage holding member being slidable along said second transverse direction so as to be moved along with said terrace wheel when said carriage moves along said second transverse direction.

8. The key code cutting device of claim 1, further comprising a supporting member mounted movably on said work table, disposed between and aligned with said first and second clamp members, and formed with a through-hole adapted to receive the key blank, said supporting member including a bearing inserted into said through-hole to support the key blank.

* * * * *